United States Patent
Sun et al.

(10) Patent No.: US 12,423,041 B2
(45) Date of Patent: Sep. 23, 2025

(54) IMAGE PROCESSING SYSTEM, CLOUD SERVING END, AND METHOD

(71) Applicant: BOE Technology Group Co., Ltd., Beijing (CN)

(72) Inventors: Jiankang Sun, Beijing (CN); Hao Zhang, Beijing (CN); Lili Chen, Beijing (CN); Xue Dong, Beijing (CN); Xinkai Li, Beijing (CN); Yongzhong Zhang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/562,350

(22) PCT Filed: May 25, 2021

(86) PCT No.: PCT/CN2021/095845
§ 371 (c)(1),
(2) Date: Nov. 20, 2023

(87) PCT Pub. No.: WO2022/246653
PCT Pub. Date: Dec. 1, 2022

(65) Prior Publication Data
US 2024/0248663 A1    Jul. 25, 2024

(51) Int. Cl.
*G06F 3/14*    (2006.01)
*G06T 9/00*    (2006.01)

(52) U.S. Cl.
CPC . *G06F 3/14* (2013.01); *G06T 9/00* (2013.01)

(58) Field of Classification Search
CPC .......... G06F 3/14; G06T 9/00; H04N 21/4402
See application file for complete search history.

(56) References Cited

U.S. PATENT DOCUMENTS 10,296,845 B2 *  5/2019  Waga ................. G06N 20/00
11,398,076 B2 *  7/2022  Mermerkaya ........ H04N 13/243
(Continued)

FOREIGN PATENT DOCUMENTS

CN    103873886 A    6/2014
CN    108683826 A    10/2018
(Continued)

OTHER PUBLICATIONS

International Search Report for PCT/CN2021/095845 Mailed Jan. 20, 2022.

*Primary Examiner* — Amy Onyekaba
(74) *Attorney, Agent, or Firm* — Ling Wu; Stephen Yang; Ling and Yang Intellectual Property

(57) ABSTRACT

Provided in the present disclosure are an image processing system, a cloud serving end, and a method. The image processing system comprises: a local end comprising at least one display terminal, a cloud serving end, and a remote end comprising a plurality of image collection units, each display terminal is configured to send a data request to the cloud serving end; the cloud serving end is configured to: receive the data request; determine a target application scenario from a plurality of application scenarios of the display terminal; determine a target image collection unit from the plurality of image collection units; process, according to a target image processing algorithm corresponding to the target application scenario and the target image collection unit, raw image data collected by the target image collected unit; send the processed image data to the display terminal, such that the display terminal displays the processed image data.

18 Claims, 7 Drawing Sheets

(56) References Cited

U.S. PATENT DOCUMENTS

| | | | |
|---|---|---|---|
| 2008/0013504 A1* | 1/2008 | Nishibayashi | G09G 3/2096 370/338 |
| 2012/0154606 A1* | 6/2012 | Ye | H04L 67/561 382/104 |
| 2014/0267752 A1* | 9/2014 | Huang | G08B 13/19669 348/159 |
| 2015/0237310 A1* | 8/2015 | Lo | G08B 13/19695 348/153 |
| 2016/0149977 A1* | 5/2016 | Addy | H04N 7/181 709/231 |
| 2016/0203641 A1 | 7/2016 | Bostick et al. | |
| 2016/0277486 A1* | 9/2016 | Chen | H04L 67/1074 |
| 2017/0094262 A1* | 3/2017 | Peterson | G06T 15/205 |
| 2017/0294090 A1* | 10/2017 | Sentosa | G08B 13/19619 |
| 2019/0057589 A1* | 2/2019 | Zhao | G08B 13/19602 |
| 2019/0272801 A1* | 9/2019 | Li | G09G 5/377 |
| 2020/0084366 A1* | 3/2020 | Fujiwara | H04R 3/005 |
| 2021/0227129 A1* | 7/2021 | Honda | H04N 1/00167 |
| 2021/0335109 A1* | 10/2021 | Kolavennu | G06F 16/51 |
| 2021/0343081 A1* | 11/2021 | Mermerkaya | H04N 13/25 |
| 2021/0383841 A1* | 12/2021 | Nakashima | H04N 21/4302 |
| 2022/0394140 A1* | 12/2022 | Takahashi | H04N 23/60 |
| 2022/0414363 A1* | 12/2022 | Tang | H04L 67/10 |

FOREIGN PATENT DOCUMENTS

| | | |
|---|---|---|
| CN | 109816795 A | 5/2019 |
| CN | 110351535 A | 10/2019 |
| CN | 111770306 A | 10/2020 |

\* cited by examiner

IMAGE PROCESSING SYSTEM, CLOUD SERVING END, AND METHOD

CROSS-REFERENCE TO RELATED APPLICATION

The present application is a U.S. National Phase Entry of International Application No. PCT/CN2021/095845 having an international filing date of May 25, 2021, the content of which is hereby incorporated by reference.

TECHNICAL FIELD

The present disclosure relates to the field of image processing technologies, in particular to an image processing system, a cloud serving end, and a method.

BACKGROUND

With development of image acquisition technologies and sensing technologies, cameras have been widely used in application scenarios such as intelligent surveillance and smart home. In these application scenarios, corresponding terminal devices are often required to intelligently process acquired images, and then present results to users. Even in subdivided scenarios such as First Person View (FPV), remote viewing, and reversing images of vehicles, it is still required to equip a remote end and a local end with a Personal Computer (PC) or other devices for image acquisition and content display control, and each camera in the remote end is equipped with at least one Image Signal Processing (ISP) chip to improve image quality. In addition, each display terminal on the local end can only display an image under an application scenario acquired by one camera. It may be seen that in an existing whole image processing process there are technical problems of a high cost and a low data sharing efficiency.

SUMMARY

The present disclosure provides an image processing system, a cloud serving end, and a method, and specific solutions are as follows.

An embodiment of the present disclosure provides an image processing system, wherein, including: a local end including at least one display terminal, a cloud serving end, and a remote end including a plurality of image acquisition units. Each display terminal is configured to send a data request to the cloud serving end. The cloud serving end is configured to receive the data request, determine a target application scenario from a plurality of application scenarios of the display terminal, and determine a target image acquisition unit from the plurality of image acquisition units, process raw image data acquired by the target image acquisition unit according to a target image processing algorithm corresponding to the target application scenario and the target image acquisition unit, and send the processed image data to the display terminal to enable the display terminal to display the processed image data.

Optionally, in an embodiment of the present disclosure, the cloud serving end includes an image processing module. The image processing module is configured to store a correspondence relationship table among an image processing algorithm, an application scenario and an image acquisition unit, wherein the correspondence relationship table includes a plurality of image processing algorithms; determine the target application scenario and the target image acquisition unit corresponding to the raw image data; and according to the correspondence relationship table, determine a target image algorithm corresponding to the target application scenario and the target image acquisition unit from the plurality of image processing algorithms.

Optionally, in an embodiment of the present disclosure, the remote end includes a codec module coupled with each of the image acquisition units. The codec module is configured to receive the data request from the cloud serving end and drive the target image acquisition unit to acquire the raw image data; and encode the raw image data, the target application scenario, and the target image acquisition unit into a single-channel digital signal, and send the digital signal to the image processing module.

Optionally, in an embodiment of the present disclosure, the remote end includes a decoding module coupled with each of the image acquisition units. The decoding module is configured to receive the data request from the cloud serving end and drive the target image acquisition unit to acquire the raw image data; and send the raw image data to the image processing module.

Optionally, in an embodiment of the present disclosure, the cloud serving end further includes a display processing module. The display processing module is configured to receive the data request from the display terminal; analyze the data request and determine a display parameter corresponding to the display terminal; and determine the target application scenario from the plurality of application scenarios of the display terminal, and determine an image acquisition unit matching with the display parameter from the plurality of image acquisition units as the target image acquisition unit.

Optionally, in an embodiment of the present disclosure, the display terminal is configured to receive the processed image data from the cloud serving end; convert the processed image data from a single-channel digital signal into a multi-channel analog signal; and perform display according to the analog signal.

Optionally, in an embodiment of the present disclosure, the display terminal is configured to receive an input operation of a user, and generate the data request in response to the input operation; and send the data request to the cloud serving end to enable the cloud serving end to determine the target application scenario from the plurality of application scenarios of the display terminal according to the data request, and to determine the target image acquisition unit from the plurality of image acquisition units.

Accordingly, an embodiment of the present disclosure provides a cloud serving end, which includes a display processing module and an image processing module. The display processing module is configured to receive a data request sent by any one display terminal in a local end including at least one display terminal; determine a target application scenario from a plurality of application scenarios of the display terminal according to the data request, and determine a target image acquisition unit from a plurality of image acquisition units included by a remote end. The image processing module is configured to process raw image data acquired by the target image acquisition unit according to a target image processing algorithm corresponding to the target application scenario and the target image acquisition unit, and send the processed image data to the display terminal to enable the display terminal to display the processed image data.

Optionally, in an embodiment of the present disclosure, the image processing module is configured to store a correspondence relationship table among an image processing algorithm, an application scenario and an image acquisition unit, wherein the correspondence relationship table includes a plurality of image processing algorithms; determine the target application scenario and the target image acquisition unit corresponding to the raw image data; and according to the correspondence relationship table, determine a target image algorithm corresponding to the target application scenario and the target image acquisition unit from the plurality of image processing algorithms.

Optionally, in an embodiment of the present disclosure, the display processing module is further configured to analyze the data request and determine a display parameter corresponding to the display terminal; and determine a target application scenario from a plurality of application scenarios of the display terminal, and determine an image acquisition unit matching with the display parameter from the plurality of image acquisition units as a target image acquisition unit.

Accordingly, an embodiment of the present disclosure provides an image processing method, which is applied to a cloud serving end, wherein the method includes: receiving a data request sent by any one display terminal in a local end including at least one display terminal; determining a target application scenario from a plurality of application scenarios of the display terminal according to the data request, and determining a target image acquisition unit from a plurality of image acquisition units included by a remote end; processing raw image data acquired by the target image acquisition unit according to a target processing algorithm corresponding to the target application scenario and the target image acquisition unit; and sending the processed image data to the display terminal to enable the display terminal to display the processed image data.

Optionally, in an embodiment of the present disclosure, the processing the raw image data acquired by the target image acquisition unit according to the target processing algorithm corresponding to the target application scenario and the target image acquisition unit, includes: receiving a single-channel digital signal, wherein the raw image data, the target application scenario, and the target image acquisition unit are encoded into the single-channel digital signal by a codec module, which is coupled with each of the image acquisition units, in the remote end; analyzing the target application scenario and the target image acquisition unit corresponding to the raw image data from the digital signal through an image processing module in the cloud serving end; determining a target image algorithm corresponding to the target application scenario and the target image acquisition unit from a plurality of image processing algorithms included in a correspondence relationship table according to the correspondence relationship table among an image processing algorithm, an application scenario and an image acquisition unit, stored in the cloud serving end; and processing the raw image data according to the target image algorithm.

Optionally, in an embodiment of the present disclosure, after receiving the data request sent by any one display terminal in the local end including at least one display terminal, the method further includes: analyzing the data request through a display processing module in the cloud serving end and determine a display parameter corresponding to the display terminal; and determining the target application scenario from the plurality of application scenarios of the display terminal, and determining an image acquisition unit matching with the display parameter from the plurality of image acquisition units as the target image acquisition unit.

Accordingly, an embodiment of the present disclosure provides an image processing method, which is applied to a local end including at least one display terminal, wherein the method includes: sending a data request to a cloud serving end through any one of the at least one display terminal, to enable the cloud serving end to determine a target application scenario from a plurality of application scenarios of the display terminal according to the data request, and to determine a target image acquisition unit from a plurality of image acquisition units of a remote end; receiving processed image data, wherein the processed image data is obtained after the cloud serving end processes raw image data acquired by the target image acquisition unit according to a target image processing algorithm corresponding to the target application scenario and the target image acquisition unit; and displaying the processed image data.

Optionally, in an embodiment of the present disclosure, the displaying the processed image data, includes: processing the processed image data from a single-channel digital signal into a multi-channel analog signal; and performing display according to the analog signal.

Optionally, in an embodiment of the present disclosure, before sending the data request to the cloud serving end through any one of the at least one display terminal, the method further includes: receiving a first input operation of a user for a target application scenario of a plurality of application scenarios of any one of the at least one display terminal; and generating the data request in response to the first input operation.

Optionally, in an embodiment of the present disclosure, before sending the data request to the cloud serving end through any one of the at least one display terminal, the method further includes: receiving a second input operation of a user for a target application scenario of a plurality of application scenarios of any one of the at least one display terminal and a target image acquisition unit corresponding to the target application scenario; and generating the data request in response to the second input operation.

DETAILED DESCRIPTION

In order to make objectives, technical solutions, and advantages of embodiments of the present disclosure more clear, the technical solutions of the embodiments of the present disclosure will be clearly and completely described below with reference to the drawings of the embodiments of the present disclosure. Apparently, the described embodiments are a part of the embodiments of the present disclosure, not all of the embodiments. Furthermore, without a conflict, embodiments in the present disclosure and features in the embodiments may be combined with each other. Based on the described embodiments of the present disclosure, all other embodiments obtained by those of ordinary skills in the art without inventive effort are within the protection scope of the present disclosure.

Unless otherwise defined, technical terms or scientific terms used in the present disclosure should have the meanings as commonly understood by those of ordinary skills in the art that the present disclosure belongs to. "Include", "contain", or a similar word used in the present disclosure means that elements or objects appearing before the word cover elements or objects listed after the word and their equivalents, but do not exclude other elements or objects.

In the existing art, for FPV, remote viewing, reversing images of vehicles, and other subdivided scenarios, it is usually required to equip a PC or another device at a remote end and a local end for image acquisition and content display control, and each camera in the remote end is equipped with at least one ISP chip to improve corresponding image quality. It may be seen that the existing whole image processing process has a high cost and a low data transmission efficiency.

In view of this, embodiments of the present disclosure provide an image processing system, a cloud serving end, and a method, which are used for reducing an image processing cost and improving a data sharing efficiency.

Figure 1:
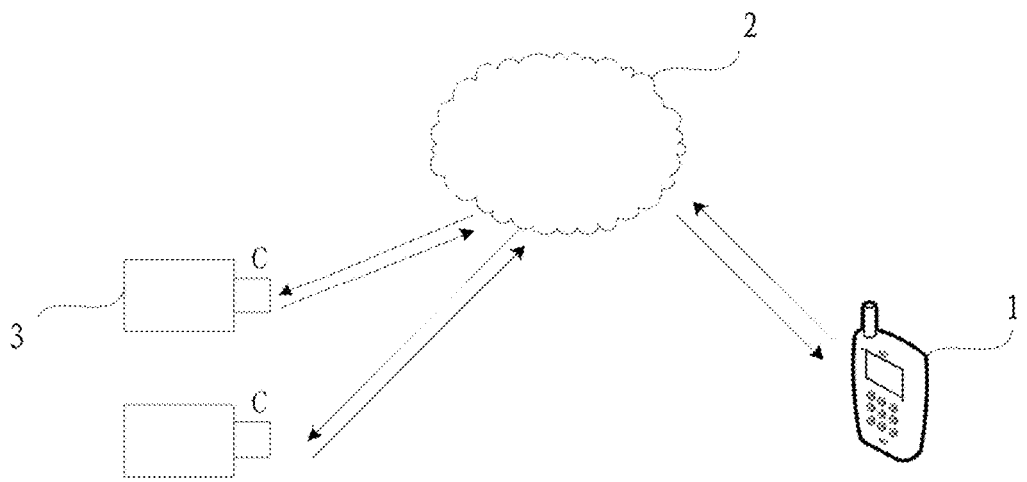
FIG. 1 is a schematic diagram of one of application scenarios used by an image processing system according to an embodiment of the present disclosure.

An image processing system according to an embodiment of the present disclosure may be applied to an application scenario shown in FIG. 1. The application scenario shown in FIG. 1 includes a terminal device 1, a cloud server 2, and a plurality of cameras 3. FIG. 1 illustrates a case where the plurality of cameras 3 are two cameras, wherein the terminal device 1 may be a mobile phone, a tablet computer, Augmented Reality (AR) glasses, etc., which are not limited herein; and the cloud server 2 may be a server cluster consisting or cloud computing center of several servers. The terminal device 1, the cloud server 2, and the cameras 3 are connected through a network, and the network may be any communication network such as a local area network, a wide area network, or a mobile Internet. In another possible application scenario, for example, a quantity of terminal devices may be multiple.

It should be noted that the above-mentioned application scenarios are shown only for ease of understanding the spirit and principles of the present disclosure, and the embodiments of the present disclosure are not limited in this respect. On the contrary, the embodiments of the present disclosure may be applied to any applicable scenario.

An image processing system according to an embodiment of the present disclosure will be described below in connection with the application scenario shown in FIG. 1.

Figure 2:
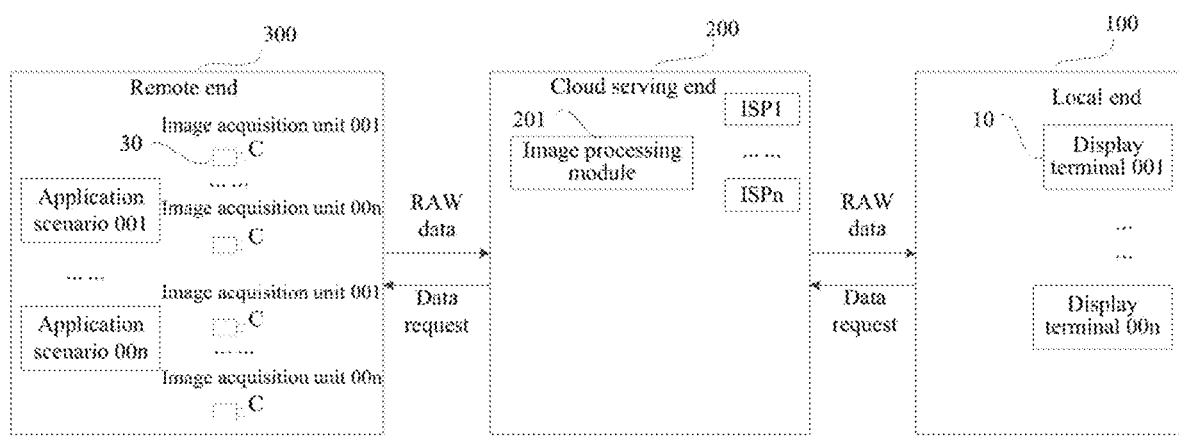
FIG. 2 is a schematic diagram of a structure of an image processing system according to an embodiment of the present disclosure.

Referring to FIG. 2, which is a schematic diagram of a structure of an image processing system according to an embodiment of the present disclosure, and the image processing system includes: a local end 100 including at least one display terminal 10, a cloud serving end 200, and a remote end 300 including a plurality of image acquisition units 30. Each display terminal 10 is configured to send a data request to the cloud serving end 200. The cloud serving end 200 is configured to receive the data request, determine a target application scenario from a plurality of application scenarios of the display terminal 10, and determine a target image acquisition unit from the plurality of image acquisition units 30, process raw image data acquired by the target image acquisition unit according to a target image processing algorithm corresponding to the target application scenario and the target image acquisition unit, and send processed image data to the display terminal 10 to enable the display terminal 10 to display the processed image data.

In the embodiment of the present disclosure, at least one display terminal included by the local end 100 may be one or more, and a quantity of display terminals 10 included by the local end 100 may be set according to actual application requirements, which is not limited here. A quantity of the plurality of image acquisition units 30 included by the remote end 300 may be n, and n is an integer greater than 1. The quantity of image acquisition units 30 may be set according to actual application requirements, and each image acquisition unit 30 may be a camera, an image sensor, or an image acquisition card, which is not limited herein. In addition, the display terminal 10 may be a Liquid Crystal Display (LCD), a Quantum Dot Light Emitting Diodes (QLED) display, or an Organic Light Emitting Diode (OLED) display, etc., which is not limited herein, and the display terminal 10 may further include a display screen having a touch control function.

In a specific implementation process, each display terminal 10 of the at least one display terminal is configured to send a data request to the cloud serving end. The data request may be triggered manually by a user on the display terminal 10, and may be an input operation of the user received by the display terminal 10, for example, the input operation is a selection operation of the user for an application scenario and a camera model. The display terminal 10 generates a display request for displaying image content in response to the input operation. For example, after the application scenario and the camera model are selected by the user on the display terminal 10, a data request for acquiring an image through a camera corresponding to the camera model and displaying corresponding image content under the selected application scenario is generated.

The cloud serving end 200 receives the data request from the display terminal 10, determines a target application scenario from a plurality of application scenarios of the display terminal 10, and determines a target image acquisition unit from the plurality of image acquisition units, wherein a quantity of the plurality of application scenarios may be m, m is an integer greater than 1, and each application scenario may be remote viewing, human-computer interaction, or reversing images of vehicles, etc. The target image acquisition unit may be one, and the target application scenario may be one, which may be set according to an actual application and is not limited herein.

The cloud serving end 200 may further process raw image data acquired by the target image acquisition unit according to a target image processing algorithm corresponding to the target application scenario and the target image acquisition unit, and send processed image data to the display terminal 10 so that the display terminal 10 displays the processed image data. The raw image data may be data of a digital signal, wherein the target image acquisition unit converts an optical signal conducted from the outside into an electrical signal, and then converts the electrical signal into the digital signal. For example, the raw image data is image data characterized by a gray value of 8 bits. The target image processing algorithm includes at least one of a black level correction algorithm, a bad point correction algorithm, a de-noising algorithm, an automatic white balance algorithm, and a data enhancement algorithm. After the raw image data is processed through a black level correction algorithm, a black level in the raw image data may be removed, thereby improving image quality. If there is a bad point in an image, not only values of surrounding pixel points will be affected adversely, but also false colors at an edge of the image will be caused, and a phenomenon of flicker of partial pixels in the image will be caused. By performing bad point correction on the raw image data, accuracy of pixel values in the image is ensured. By performing an automatic white balance processing on the raw image data, an influence of a light source on imaging of the image acquisition unit is eliminated, constancy of a human visual system is simulated, so that white seen by a human eye in any scenario is ensured to be true white, thereby improving image quality. In addition, local and overall contrast ratios of the raw image data can be enhanced through the image enhancement algorithm, so that original unsaturated color information becomes saturated and enriched.

In a specific implementation process, a person skilled in the art may select a corresponding image processing algorithm to process the raw image data according to actual application requirements. After the target application scenario and the target image processing algorithm corresponding to the remote end are determined, the raw image data from the remote end under the target application scenario may be processed, thereby improving image quality and ensuring display quality of the display terminal.

Still as shown in FIG. 2, the local end 100 includes a display terminal 001, a display terminal 002, a display terminal 003, . . . , and a display terminal 00n. An application scenario 001 is determined as a target application scenario from a plurality of application scenarios including an application scenario 001, an application scenario 002, an application scenario 003, . . . and an application scenario 00n included by the display terminal 001 in the local end 100. An image acquisition unit 002 is determined as a target image acquisition unit from a plurality of image acquisition units including an image acquisition unit 001, an image acquisition unit 002, an image acquisition unit 003, . . . , and an image acquisition unit 00n. If an image processing algorithm corresponding to the application scenario 001 and the image acquisition unit 002 is ISP1, the cloud serving end 200 may process raw image data acquired by the image acquisition unit 002 according to ISP1. Thus, the display terminal 001 may display an image acquired by the image acquisition unit 002 under the application scenario 001. If the application scenario 001 is determined as a target application scenario and the image acquisition unit 002 is determined as a target image acquisition unit on another display terminal of the local end 100 different from the display terminal 001, accordingly, the another display terminal may still display an image acquired by the image acquisition unit 002 under the application scenario 001, thus each display terminal in the local end 100 may share image data acquired by a same image acquisition unit in the remote end 300, thereby ensuring a data sharing efficiency of the image processing system.

Still taking the above as an example, if in the display terminal 001 in the local end 100, the application scenario 003 is determined as a target application scenario and the image acquisition unit 003 is determined as a target image acquisition unit, accordingly, the display terminal 001 may display an image acquired by the image acquisition unit 003, thus a same display terminal in the local end 100 may display image data acquired by different image acquisition units in the remote end 300, thereby achieving sharing of image data acquired by different image acquisition units by the same display terminal and ensuring a data sharing efficiency of the image processing system.

In addition, no matter which target application scenario is determined from the plurality of application scenarios and which target image acquisition unit is determined from the plurality of image acquisition units, the cloud serving end 200 may adopt a target image processing algorithm corresponding to the target application scenario and the target image acquisition unit to process raw image data acquired by the target image acquisition unit. There is no need to set an ISP chip in each display terminal 10 of the local end 100 and each image acquisition unit of the remote end 300 during a whole processing process, thereby ensuring that the image processing system reduces an image processing cost while taking into account a data sharing efficiency.

FIG. 2 illustrates a schematic diagram of a structure, in which a quantity of the display terminals 10, a quantity of the image acquisition units 30, and a quantity of image processing algorithms included by the cloud serving end 200 are all n. In a specific implementation process, a quantity of the display terminals 10, a quantity of the image acquisition units 30, and a quantity of image processing algorithms in the image processing system may be other cases, and will not be described in detail here.

In an embodiment of the present disclosure, in an image processing system including a local end 100 including at least one display terminal 10, a cloud serving end 200, and a remote end 300 including a plurality of image acquisition units 30, each display terminal 10 is configured to send a data request to the cloud serving end 200, the cloud serving end 200 is configured to receive the data request, according to the data request, determine a target application scenario from a plurality of application scenarios of the display terminal 10, and determine a target image acquisition unit from the plurality of image acquisition units 30, process raw image data acquired by the target image acquisition unit according to a target image processing algorithm corresponding to the target application scenario and the target image acquisition unit, and then send processed image data to the display terminal 10. The display terminal 10 displays the processed image data. That is to say, processing of image acquisition content is achieved through the cloud serving end 200. During a whole image processing process, not only there is no need to configure image processing devices at the remote end 300 and the local end 100 respectively, but also there is no need to configure an image processing chip for each image acquisition unit at the remote end 300, thus reducing an image processing cost. In addition, a same display terminal in the local end 100 may also display image data from different image acquisition units in the remote end 300, thus achieving sharing of the image data acquired by different image acquisition units by the same display terminal and ensuring a data sharing efficiency of the image processing system.

In an embodiment of the present disclosure, still in conjunction with FIG. 2, the cloud serving end 200 includes an image processing module 201. The image processing module 201 is configured to store a correspondence relationship table among an image processing algorithm, an application scenario and an image acquisition unit, wherein the correspondence relationship table includes a plurality of image processing algorithms; determine the target application scenario and the target image acquisition unit corresponding to the raw image data; and according to the correspondence relationship table, determine a target image algorithm corresponding to the target application scenario and the target image acquisition unit from the plurality of image processing algorithms.

In a specific implementation process, in the image processing module 201, a correspondence relationship table among an image processing algorithm, an application scenario and an image acquisition unit is stored, the correspondence relationship table includes a plurality of image processing algorithms. The correspondence relationship table may be pre-stored through the cloud serving end 200 or manually established according to user requirements, the correspondence relationship table may be fixed, and the correspondence relationship table may be updated in real time according to an actual usage situation of a user. For example, the correspondence relationship table is updated according to user's evaluation of quality of images, acquired by the remote end 300, on the display terminal 10 of the local end 100. For example, if an image processing algorithm of a corresponding relationship a in the correspondence relationship table is adopted to process raw image data acquired by the image acquisition unit 001, after the processed image data is displayed by the display terminal 001, the user's evaluation shows a poor display quality, then the corresponding relationship a may be updated according to an image processing algorithm with user's evaluation showing a good display quality, thus achieving updating of the correspondence relationship table and improving use experience of users. Of course, other implementations may be adopted by those skilled in the art to update the correspondence relationship table, which will not be described in detail herein.

In a specific implementation process, after determining the target application scenario and the target image acquisition unit corresponding to the raw image data, the image processing module 201 may determine a target image algorithm corresponding to the target application scenario and the target image acquisition unit from the plurality of image processing algorithms according to the correspondence relationship table, thus the image processing module 201 may process the raw image data according to the target image algorithm, thereby ensuring quality of the processed image data.

Figure 3:
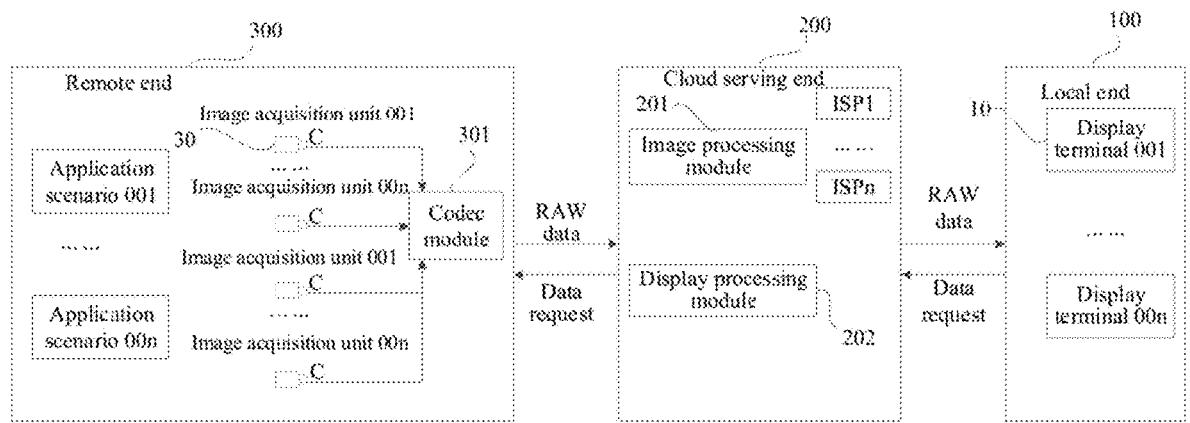
FIG. 3 is a schematic diagram of a structure of an image processing system according to an embodiment of the present disclosure.

In an embodiment of the present disclosure, as shown in FIG. 3, which is a schematic diagram of a structure of the image processing system, the remote end 300 includes a codec module 301 coupled with each of the image acquisition units 30. The codec module 301 is configured to receive the data request from the cloud serving end and drive the target image acquisition unit to acquire the raw image data; and encode the raw image data, the target application scenario, and the target image acquisition unit into a single-channel digital signal, and send the digital signal to the image processing module.

Figure 4:
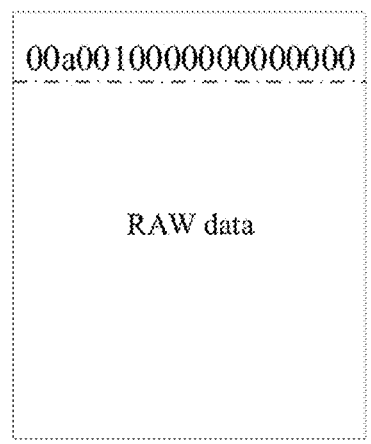
FIG. 4 is a schematic diagram of one of encoding formats of raw image data in an image processing system according to an embodiment of the present disclosure.

In a specific implementation process, the remote end 300 also includes the codec module 301, which is coupled with each of the image acquisition units 30 in the remote end 300. The codec module 301 receives the data request from the cloud serving end 200, analyzes the data request, and drives the target image acquisition unit in the plurality of image acquisition units to acquire an image so as to acquire the raw image data. In addition, the codec module 301 encodes the raw image data, the target application scenario, and the target image acquisition unit into a single-channel digital signal. The codec module 301 may encode a number representing the target application scenario, a model representing the target image acquisition unit, and the raw image data. For example, if the number of the target application scenario is 00a, the model of the target image acquisition unit is 001, and the raw image data is RAW data, "00a001" may be directly attached to the raw image data in a form of a gray value, as shown in FIG. 4, which is a schematic diagram of one of coding formats of corresponding raw image data, wherein the target application scenario and a model of the remote end are attached to a first row of an image.

After the codec module 301 performs encoding processing on the raw image data, the target application scenario, and the target image acquisition unit, the codec module 301 sends an encoded single-channel digital signal to the cloud serving end 200. The cloud serving end 200 analyzes the digital signal, determines a target image processing algorithm corresponding to the target application scenario and the target image acquisition unit according to the correspondence relationship table, processes the raw image data, and obtains processed image data. For example, if "00a001" is obtained from a first row of the digital signal, analyzed "00a" of first to third bits corresponds to the number of the target application scenario, and "001" of fourth to sixth bits corresponds to the model of the target image acquisition unit. After the analysis, the cloud serving end 200 may select an image processing algorithm suitable for the target application scenario and the target image acquisition unit according to the number of the target application scenario and the model of the target image acquisition unit, e.g., an algorithm b, to process raw image data acquired by the target image acquisition unit, so as to obtain processed image data. On one hand, the codec module 301 may encode the raw image data, the target application scenario, and the target image acquisition unit into a single-channel digital signal, and then transmit the single-channel data signal, thereby improving a data transmission efficiency. On the other hand, the cloud serving end 200 may allocate a more appropriate target image processing algorithm to the raw image data acquired by the target image acquisition unit, thereby ensuring image quality of the acquired image, and further ensuring display quality of the display terminal and improving use experience of users.

Figure 5:
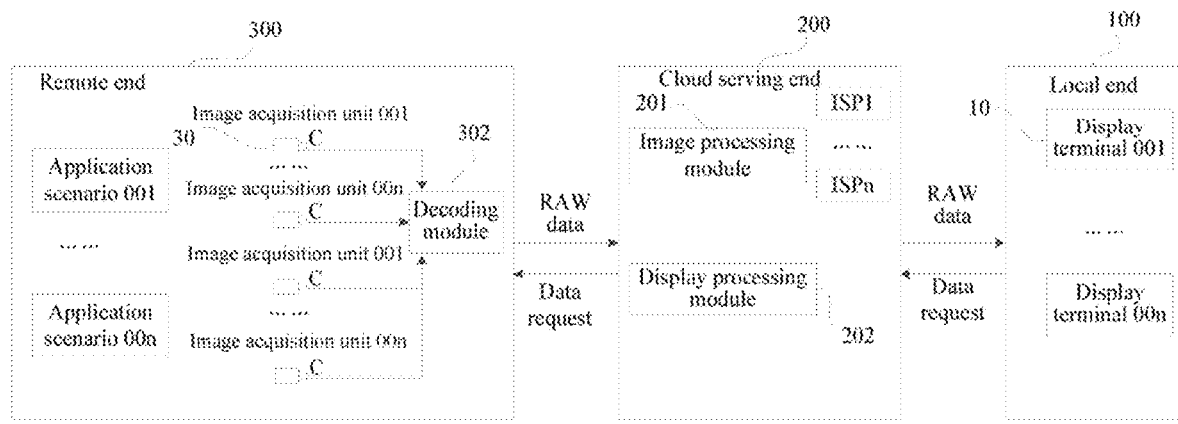
FIG. 5 is a schematic diagram of a structure of an image processing system according to an embodiment of the present disclosure.

In an embodiment of the present disclosure, as shown in FIG. 5, which is a schematic diagram of a structure of the image processing system, the remote end 300 includes a decoding module 302 coupled with each of the image acquisition units 30. The decoding module 302 is configured to receive the data request from the cloud serving end 200 and drive the target image acquisition unit to acquire the raw image data; and send the raw image data to the image processing module 201.

In a specific implementation process, the decoding module 302 in the remote end 300, which is coupled with each of the image acquisition units 30, receives the data request from the cloud serving end 200. The decoding module 302 decodes the data request, drives the target image acquisition unit to acquire the raw image data, and then the decoding module 302 sends the raw image data to the image processing module 201. The image processing module 201 determines the target image processing algorithm for processing the raw image data. The image processing module 201 processes the raw image data according to the target image processing algorithm, and then sends processed image data to the display terminal 10. Since during the whole process only the decoding module 302 in the remote end 300 needs to decode the data request and drive the corresponding target image acquisition unit to acquire the raw image data, and then the target image processing algorithm for processing the raw image data is determined, thereby improving an efficiency of processing the raw image data.

In an embodiment of the present disclosure, still in conjunction with FIG. 3, the cloud serving end 200 further includes a display processing module 202. The display processing module 202 is configured to receive the data request from the display terminal; analyze the data request and determine a display parameter corresponding to the display terminal; determine the target application scenario from the plurality of application scenarios of the display terminal, and determine an image acquisition unit matching with the display parameter from the plurality of image acquisition units as the target image acquisition unit.

In a specific implementation process, the cloud serving end 200 also includes a display processing module 202. The display processing module 202 receives the data request from the display terminal 10, and the display processing module 202 analyzes the data request to obtain the display parameter corresponding to the display terminal 10. The display parameter includes a resolution, a refresh rate, an interface type, or a panel type, etc., which are not limited here. The interface type includes a High Definition Multimedia Interface (HDMI), a Display Port (DP), a Video Graphics Array (VGA), and a Digital Visual Interface (DVI), etc. The panel type includes Vertical Alignment (VA), Twisted Nematic (TN), and In-Panel Switching (IPS), etc. For example, after a user selects a target application scenario in an application scenario list of the display terminal 10, the cloud serving end 200 may analyze the data request and obtain a display parameter corresponding to the display terminal 10. Then, a target application scenario is determined from a plurality of application scenarios of the display terminal 10, and an image acquisition unit matching with the display parameter is determined from the plurality of image acquisition units as the target image acquisition unit, wherein the plurality of application scenarios may be scenarios in the application scenario list.

As a specific example, the cloud serving end 200 reads a character string including supplier information, color setting information, manufacturer preset information, a display name, a display serial number, a supported maximum resolution, a supported frame rate, and a display bit width of a display terminal A through an Extend Display Identification Data (EDID) protocol, and analyzes the character string to determine display parameters of the display terminal A. A camera a meeting relevant parameter requirements is matched through the supported maximum resolution, supported frame rate, and the display bit width in the display parameters of the display terminal A. A maximum resolution, a sampling frame rate, and a data bit width of the determined camera a are matched with the display parameters of the display terminal A. Since a matched image acquisition unit may be determined according to the display parameters of the display terminal 10, and the matched image acquisition unit may be used as the target image acquisition unit, display quality of the display terminal 10 may be guaranteed when the display terminal 10 displays image data acquired by the target image acquisition unit.

In an embodiment of the present disclosure, the display terminal 10 is configured to receive the processed image data from the cloud serving end 200; convert the processed image data from a single-channel digital signal into a multi-channel analog signal; and perform display according to the analog signal.

In a specific implementation process, after the display terminal 10 receives the processed image data from the cloud serving end 200, the processed image data is converted from a single-channel digital signal into a multi-channel analog signal, and then the analog signal is displayed by the display terminal 10. For example, the multi-channel analog signal is analog signals of three channels, i.e., R, G, and B channels. On one hand, in the whole data transmission and processing process before the display terminal 10 displays image data acquired by the target image acquisition unit, a single-channel digital signal is processed, thus ensuring a transmission efficiency of the single-channel digital signal. On the other hand, before the display terminal 10 displays the image data acquired by the target image acquisition unit, the display terminal 10 converts the single-channel digital signal into a multi-channel analog signal, and then the display terminal 10 displays the multi-channel analog signal, thus ensuring a display function of the display terminal 10 and improving use performance of the image processing system.

In an embodiment of the present disclosure, the display terminal 10 is configured to receive an input operation of a user, and generate the data request in response to the input operation; and send the data request to the cloud serving end 200 so that the cloud serving end 200 determines the target application scenario from the plurality of application scenarios of the display terminal 10 according to the data request, and determines the target image acquisition unit from the plurality of image acquisition units.

In a specific implementation process, the display terminal 10 may also receive an input operation of a user, which may be an input operation of the user for the target application scenario in the display terminal 10 and the target image acquisition unit corresponding to the target application scenario. The input operation may be a click operation, a double-click operation, and a drag operation, etc. of the user for any item in an application scenario list in the display terminal 10. The input operation may be a click operation, a double-click operation, a drag operation, etc. of the user for any item in an image acquisition unit list in the display terminal 10. Of course, the input operation may be set according to actual application requirements, which is not limited herein.

After the display terminal 10 receives the input operation of the user, the display terminal 10 generates the data request in response to the input operation, and the display terminal 10 may send the data request to the display processing module 202 in the cloud serving end 200. Then, the display processing module 202 analyzes the data request, determines the target application scenario from the plurality of application scenarios of the display terminal 10, and determines the target image acquisition unit from the plurality of image acquisition units. For example, an application scenario list and a camera model list are displayed on a display interface of the display terminal 10, wherein a plurality of items in the application scenario list include an application scenario A, an application scenario B, an application scenario C, and an application scenario D, and the camera model list includes a camera a, a camera b, and a camera c. After the application scenario A and the camera a are selected by a user, the display terminal 10 generates the data request for displaying image content and sends the data request to the display processing module 202. After receiving the data request, the display processing module 202 analyzes the data request to determine the application scenario A selected by the user from the application scenario list, and the application scenario A may be taken as a target application scenario.

The display processing module 202 may also determine the camera model a selected by the user from the camera model list of the display terminal 10, and a camera corresponding to the camera model a may be used as a target image acquisition unit corresponding to the target application scenario. In this way, the user may display raw image data acquired by the target image acquisition unit under the target application scenario through the display terminal 10 according to actual requirements, thereby satisfying personalized display requirements of the users through the display terminal 10.

Figure 6:
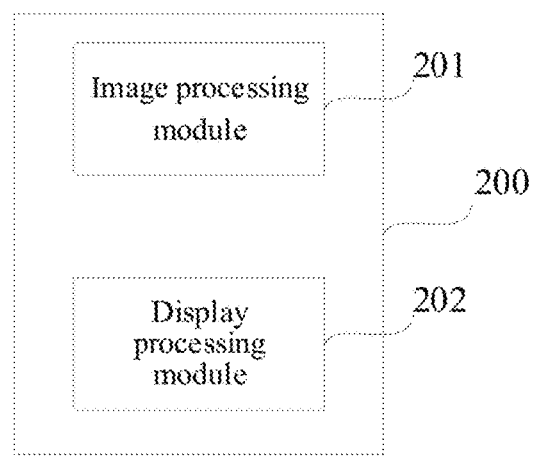
FIG. 6 is a schematic diagram of a structure of a cloud serving end according to an embodiment of the present disclosure.

Based on the same concept, as shown in FIG. 6, an embodiment of the present disclosure also provides a cloud serving end 200. The cloud serving end 200 includes: a display processing module 202 and an image processing module 201. The display processing module 202 is configured to receive a data request sent by any one display terminal in a local end including at least one display terminal; determine a target application scenario from a plurality of application scenarios of the display terminal according to the data request, and determine a target image acquisition unit from a plurality of image acquisition units included by a remote end.

The image processing module 201 is configured to process raw image data acquired by the target image acquisition unit according to a target image processing algorithm corresponding to the target application scenario and the target image acquisition unit, and send processed image data to the display terminal so that the display terminal displays the processed image data.

In an embodiment of the present disclosure, the image processing module 202 is configured to store a correspondence relationship table among an image processing algorithm, an application scenario and an image acquisition unit, wherein the correspondence relationship table includes a plurality of image processing algorithms; determine the target application scenario and the target image acquisition unit corresponding to the raw image data; and according to the correspondence relationship table, determine a target image algorithm corresponding to the target application scenario and the target image acquisition unit from the plurality of image processing algorithms.

In an embodiment of the present disclosure, the display processing module 202 is further configured to analyze the data request and determine a display parameter corresponding to the display terminal; determine a target application scenario from a plurality of application scenarios of the display terminal, and determine an image acquisition unit matching with the display parameter from the plurality of image acquisition units as a target image acquisition unit.

It should be noted that specific implementations of the display processing module 202 and the image processing module 201 in the cloud serving end 200 may refer to the above-mentioned description of the image processing system, and will not be repeated here.

In a specific implementation process, through the display processing module 202 and the image processing module 201 in the cloud serving end 200, processing of raw image data acquired by any image acquisition unit in the remote end 300 may be achieved. During the whole process, not only there is no need to configure image processing devices at the remote end 300 and the local end 100 respectively, but also there is no need to configure an image processing chip for each image acquisition unit at the remote end 300, thereby reducing an image processing cost. In addition, the same display terminal 10 in the local end 100 may also display image data from different image acquisition units in the remote end 300, thus achieving sharing of the image data acquired by different image acquisition units by the same display terminal and ensuring a sharing efficiency of the image data.

Figure 7:
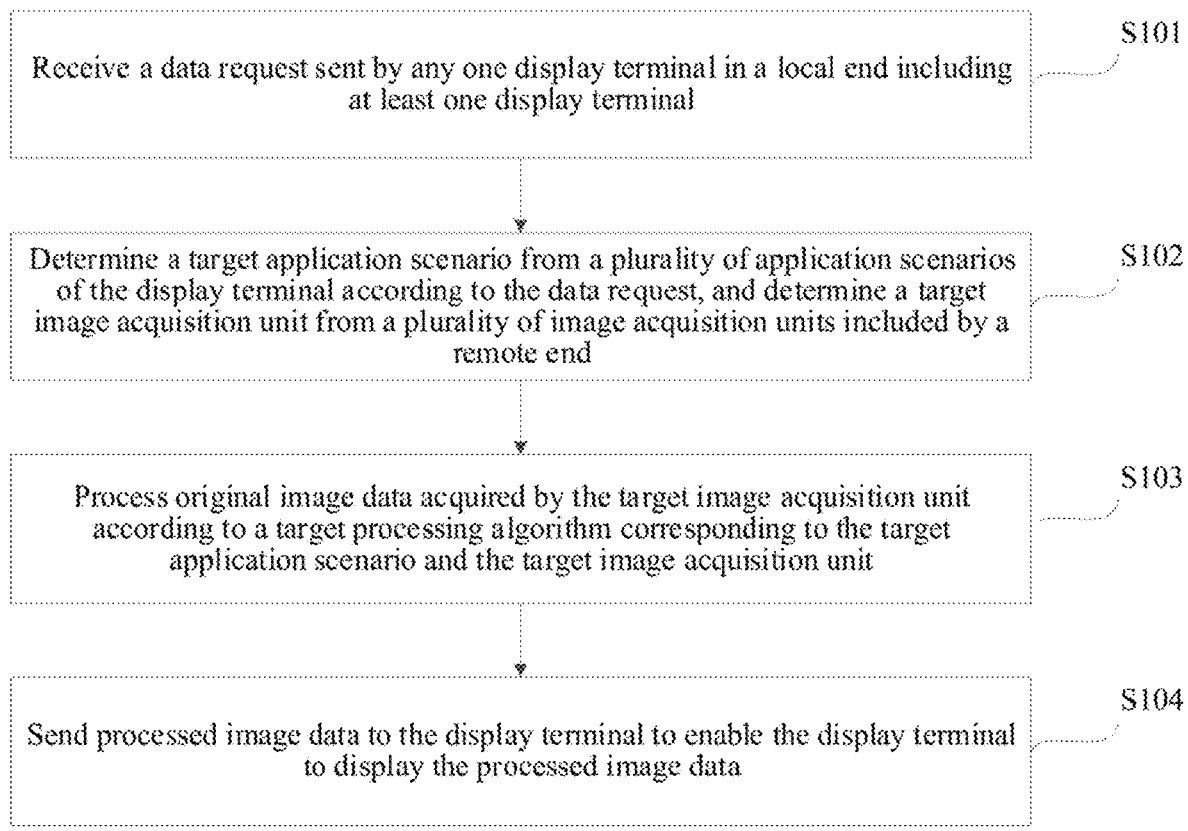
FIG. 7 is a method flowchart of an image processing method according to an embodiment of the present disclosure.

Based on the same disclosed concept, as shown in FIG. 7, an embodiment of the present disclosure also provides an image processing method applied to a cloud serving end 200, wherein including the following acts S101 to S104.

In S101, a data request sent by any one display terminal in a local end including at least one display terminal is received.

In S102, a target application scenario is determined from a plurality of application scenarios of the display terminal according to the data request, and a target image acquisition unit is determined from a plurality of image acquisition units included by a remote end.

In S103, according to a target processing algorithm corresponding to the target application scenario and the target image acquisition unit, raw image data acquired by the target image acquisition unit is processed.

In S104, the processed image data is sent to the display terminal, so that the display terminal displays the processed image data.

Figure 8:
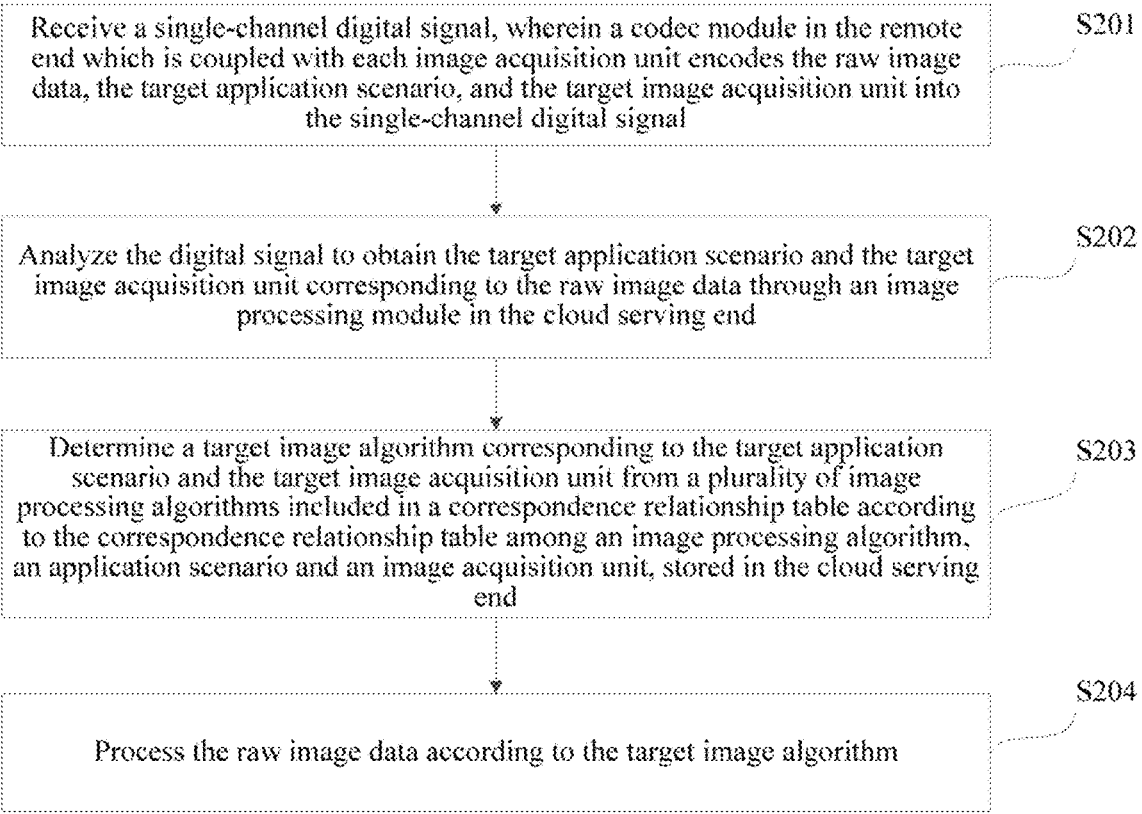
FIG. 8 is a method flowchart of act S103 in FIG. 7.

In an embodiment of the present disclosure, as shown in FIG. 8, in the act S103, according to a target processing algorithm corresponding to the target application scenario and the target image acquisition unit, processing raw image data acquired by the target image acquisition unit, includes the following acts S201 to S204. In S201, a single-channel digital signal is received, wherein a codec module in the remote end which is coupled with each image acquisition unit encodes the raw image data, the target application scenario, and the target image acquisition unit into the single-channel digital signal. In S202, the digital signal is analyzed to obtain the target application scenario and the target image acquisition unit corresponding to the raw image data through an image processing module in the cloud serving end. In S203, a target image algorithm corresponding to the target application scenario and the target image acquisition unit is determined from a plurality of image processing algorithms included in a correspondence relationship table according to the correspondence relationship table among an image processing algorithm, an application scenario and an image acquisition unit, stored in the cloud serving end. In S204, the raw image data is processed according to the target image algorithm.

Figure 9:
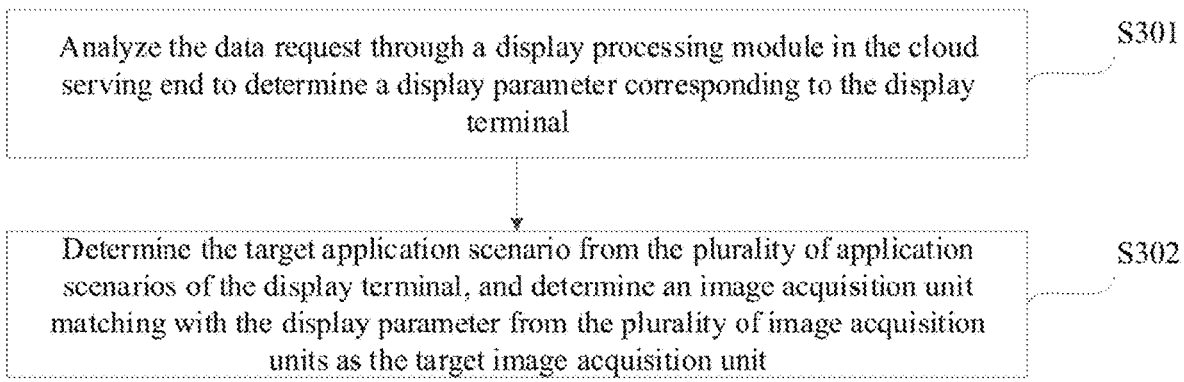
FIG. 9 is a method flowchart after act S101 in FIG. 7.

In an embodiment of the present disclosure, as shown in FIG. 9, after a data request sent by any one display terminal in a local end including at least one display terminal in the act S101, the method further includes the following acts S301 to S302. In S301, the data request is analyzed through a display processing module in the cloud serving end to determine a display parameter corresponding to the display terminal. In S302, the target application scenario is determined from the plurality of application scenarios of the display terminal, and an image acquisition unit matching with the display parameter is determined from the plurality of image acquisition units as the target image acquisition unit.

It should be noted that a principle of the image processing method applied to the cloud serving end 200 to solve a problem is similar to that of the above-mentioned image processing system. Therefore, implementation of the image processing method applied to the cloud serving end 200 may refer to implementation of the above-mentioned image processing system, and a specific structure of the cloud serving end 200 may refer to relevant implementation of the above-mentioned image processing system, repetition will not be repeated here.

Figure 10:
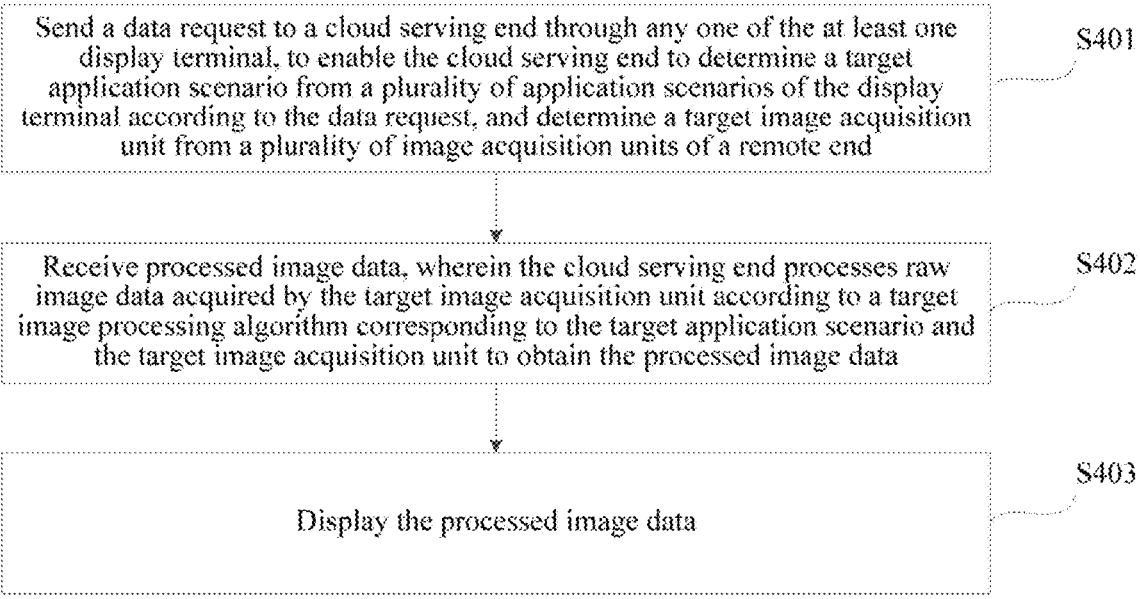
FIG. 10 is another method flowchart of an image processing method according to an embodiment of the present disclosure.

Based on the same disclosed concept, as shown in FIG. 10, an embodiment of the present disclosure also provides an image processing method applied to a local end including at least one display terminal, including the following acts S401 to S403. In S401, a data request is sent to a cloud serving end through any one of the at least one display terminal, so that the cloud serving end determines a target application scenario from a plurality of application scenarios of the display terminal according to the data request, and determines a target image acquisition unit from a plurality of image acquisition units of a remote end. In S402, processed image data is received, wherein the cloud serving end processes raw image data acquired by the target image acquisition unit according to a target image processing algorithm corresponding to the target application scenario and the target image acquisition unit to obtain the processed image data. In S403, the processed image data is displayed.

Figure 11:
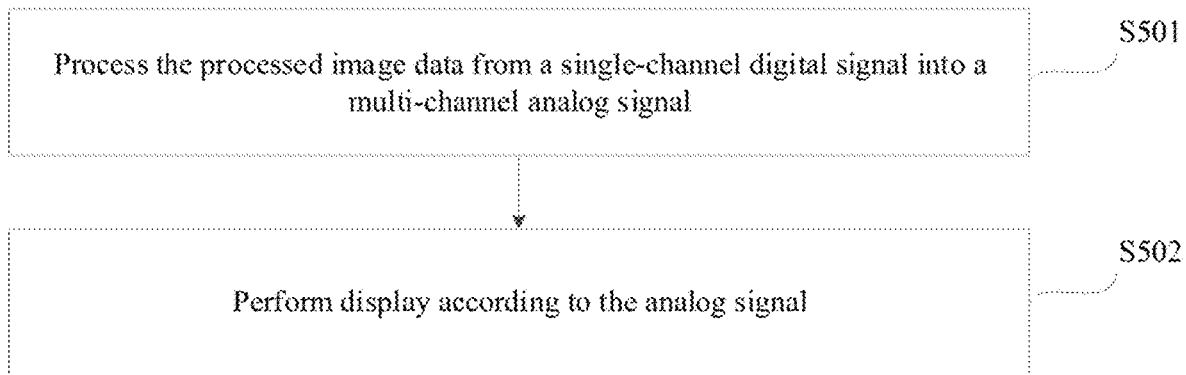
FIG. 11 is a method flowchart of act S403 in FIG. 10.

In an embodiment of the present disclosure, as shown in FIG. 11, displaying the processed image data in the act S403, includes the following acts S501 to S502. In S501, the processed image data is processed from a single-channel digital signal into a multi-channel analog signal. In S502, display is performed according to the analog signal.

Figure 12:
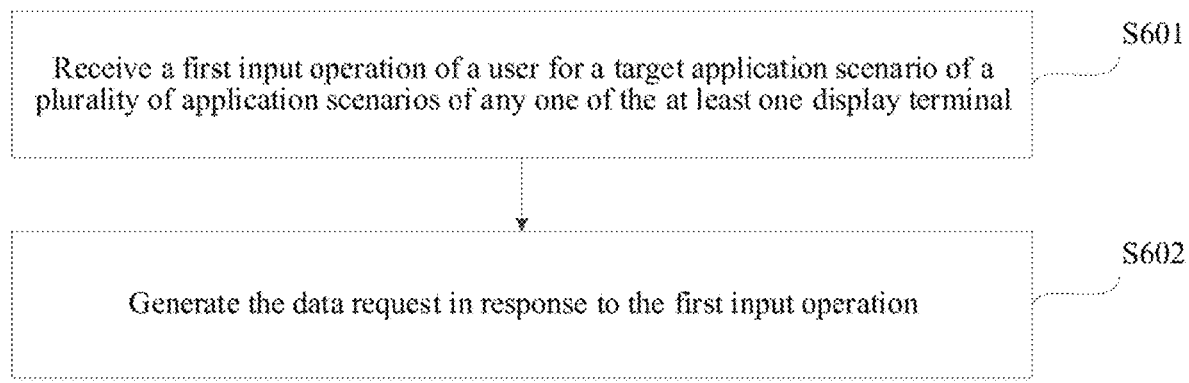
FIG. 12 is a method flowchart of a first implementation mode before act S401 in FIG. 10.

In an embodiment of the present disclosure, the following two implementation modes may be adopted to generate the data request, but the implementation modes for generating the data request are not limited to the following two implementation modes. As shown in FIG. 12, a first implementation mode is that before sending the data request to the cloud serving end through any one of the at least one display terminal in the act S401, the method further includes the following acts S601 to S602. In S601, a first input operation of a user for a target application scenario of a plurality of application scenarios of any one of the at least one display terminal is received. In S602, the data request is generated in response to the first input operation.

Figure 13:
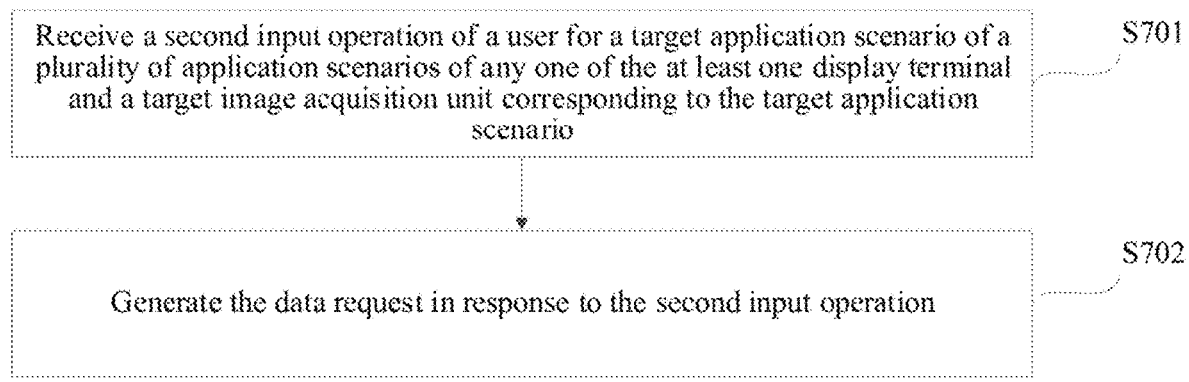
FIG. 13 is a method flowchart of a second implementation mode before act S401 in FIG. 10.

As shown in FIG. 13, a second implementation mode is that before sending the data request to the cloud serving end through any one of the at least one display terminal in the act S401, the method further includes the following acts S701 to S702. In S701, a second input operation of a user for a target application scenario of a plurality of application scenarios of any one of the at least one display terminal and a target image acquisition unit corresponding to the target application scenario is received. In S702, the data request is generated in response to the second input operation.

In a specific implementation process, the first input operation and the second input operation may be a click operation, a double-click operation, a drag operation, and a slide operation, etc., which are not limited herein.

It should be noted that a principle of the image processing method applied to the local end 100 including at least one display terminal 10 to solve a problem is similar to that of the aforementioned image processing system. Therefore, implementation of the image processing method applied to the local end 100 may refer to implementation of the aforementioned image processing system, and a specific structure of the local end 100 may refer to relevant implementation of the aforementioned image processing system, repetition will not be repeated here.

Embodiments of the present disclosure provide an image processing system, a cloud serving end 200, and a method. The image processing system includes a local end 100 including at least one display terminal 10, a cloud serving end 200, and a remote end 300 including a plurality of image acquisition units 30. Each display terminal 10 is configured to send a data request to the cloud serving end 200, the cloud serving end 200 is configured to receive the data request, according to the data request, determine a target application scenario from a plurality of application scenarios of the display terminal 10, and determine a target image acquisition unit from the plurality of image acquisition units 30, process raw image data acquired by the target image acquisition unit according to a target image processing algorithm corresponding to the target application scenario and the target image acquisition unit, and then send processed image data to the display terminal 10, and the display terminal 10 displays the processed image data. That is to say, processing of image acquisition content is achieved through the cloud serving end 200. During the whole image processing process, not only there is no need to configure image processing devices at the remote end 300 and the local end 100 respectively, but also there is no need to configure an image processing chip for each image acquisition unit at the remote end 300, thus reducing an image processing cost. In addition, a same display terminal in the local end 100 may also display image data from different image acquisition units in the remote end 300, thus achieving sharing of the image data acquired by different image acquisition units by the same display terminal and ensuring a data sharing efficiency of the image processing system.

It should be understood by those skilled in the art that the embodiments of the present disclosure may be provided as methods, systems, or computer program products. Therefore, the present disclosure may adopt a form of an entire hardware embodiment, an entire software embodiment, or an embodiment of software aspect combined with hardware aspect. Furthermore, the present disclosure may adopt a form of a computer program product implemented on one or more computer-accessed memory media (including, but is not limited to, a magnetic disk memory, a Compact Disc Read-Only Memory (CD-ROM), and an optical memory, etc.) containing computer-executable program codes therein.

The present disclosure is described with reference to flowcharts and/or block diagrams of methods, devices (systems), and computer program products according to the embodiments of the present disclosure. It should be understood that each flow and/or block in the flowcharts and/or block diagrams, as well as combinations of a flow and/or block in the flowcharts and/or block diagrams, may be implemented by computer program instructions. These computer program instructions may be provided to a processor of a general-purpose computer, a special-purpose computer, an embedded-type processing device, or another programmable data processing device to generate a machine, so that an apparatus configured to implement functions specified in one or more flows of the flowcharts and/or one or more blocks in the block diagrams is generated through instructions executed by a processor of a computer or another programmable data processing device.

These computer program instructions may also be stored in a computer-readable memory that may guide a computer or another programmable data processing device to work in a specific manner, so that the instructions stored in the computer-readable memory produce manufactured articles including an instruction apparatus, and the instruction apparatus implements functions specified in one or more flows of the flowcharts and/or one or more blocks in the block diagrams.

These computer program instructions may also be loaded onto a computer or another programmable data processing device, so that a series of operation acts are executed on the computer or another programmable device, to generate processings achieved by a computer, so that instructions executed on the computer or another programmable device provide acts for implementing functions specified in one or more flows in the flowcharts and/or one or more blocks in the block diagrams.

Although preferred embodiments of the present disclosure have been described, those skilled in the art may make additional changes and modifications to these embodiments once basic inventive concepts are known. Therefore, the appended claims are intended to be interpreted to encompass preferred embodiments as well as all changes and modifications falling within the scope of the present disclosure.

Apparently, various modifications and variations to the embodiments of the present disclosure may be made by those skilled in the art without departing from the spirit and scope of the embodiments of the present disclosure. Thus, if these modifications and variations to the embodiments of the present disclosure fall within the scope of the claims of the present disclosure and their equivalent techniques, the present disclosure is intended to include these modifications and variations.

The invention claimed is:

1. An image processing system, comprising:
a local end comprising at least one display terminal, a cloud server, and a remote end comprising a plurality of cameras; wherein
each display terminal is configured to send a data request to the cloud server;
the cloud server is configured to receive the data request, determine a target application scenario from a plurality of application scenarios of the display terminal, and determine a target camera from the plurality of cameras, process raw image data acquired by the target camera according to a target image processing algorithm corresponding to the target application scenario and the target camera, and send the processed image data to the display terminal to enable the display terminal to display the processed image data; and
the cloud server is further configured to store a correspondence relationship table among an image processing algorithm, an application scenario and a camera, wherein the correspondence relationship table comprises a plurality of image processing algorithms; determine the target application scenario and the target camera corresponding to the raw image data; and according to the correspondence relationship table, determine the target image processing algorithm corresponding to the target application scenario and the target camera from the plurality of image processing algorithms.

2. The image processing system according to claim 1, wherein the remote end comprises a codec coupled with each of the cameras,
the codec is configured to,
receive the data request from the cloud server and drive the target camera to acquire the raw image data; and
encode the raw image data, the target application scenario, and the target camera into a single-channel digital signal, and send the digital signal to the cloud server.

3. The image processing system according to claim 2, wherein the codec is configured to encode the target application scenario and the target camera and attach to the raw image data in a form of a gray value.

4. The image processing system according to claim 1, wherein the remote end comprises a decoder coupled with each of the cameras,
the decoder is configured to,
receive the data request from the cloud server and drive the target camera to acquire the raw image data; and
send the raw image data to the cloud server.

5. The image processing system according to claim 1, wherein the cloud server is further configured to,
receive the data request from the display terminal;
analyze the data request and determine a display parameter corresponding to the display terminal; and
determine the target application scenario from the plurality of application scenarios of the display terminal, and determine a camera matching with the display parameter from the plurality of cameras as the target camera.

6. The image processing system according to claim 5, wherein the display parameter includes at least one of a resolution, a refresh rate, an interface type, and a panel type.

7. The image processing system according to claim 1, wherein the display terminal is configured to,
receive the processed image data from the cloud server;
convert the processed image data from a single-channel digital signal into a multi-channel analog signal; and
perform display according to the analog signal.

8. The image processing system according to claim 7, wherein the display terminal is configured to,
receive an input operation of a user, and generate the data request in response to the input operation; and
send the data request to the cloud server to enable the cloud server to determine the target application scenario from the plurality of application scenarios of the display terminal according to the data request, and to determine the target camera from the plurality of cameras.

9. The image processing system according to claim 1, wherein the correspondence relationship table is updated in real time according to an actual usage situation.

10. The image processing system according to claim 9, wherein the correspondence relationship table is updated according to user's evaluation of quality of images.

11. A cloud server, comprising:
a transceiver and a processor; wherein
the transceiver is configured to
receive a data request sent by any one display terminal in a local end comprising at least one display terminal;
the processor is configured to
determine a target application scenario from a plurality of application scenarios of the display terminal according to the data request, and determine a target camera from a plurality of cameras comprised by a remote end; and
process raw image data acquired by the target camera according to a target image processing algorithm corresponding to the target application scenario and the target camera, the transceiver is further configured to send the processed image data to the display terminal to enable the display terminal to display the processed image data;

wherein the processor is further configured to store a correspondence relationship table among an image processing algorithm, an application scenario and a camera, wherein the correspondence relationship table comprises a plurality of image processing algorithms; determine the target application scenario and the target camera corresponding to the raw image data; and according to the correspondence relationship table, determine the target image processing algorithm corresponding to the target application scenario and the target camera from the plurality of image processing algorithms.

12. The cloud server according to claim 11, wherein the processor is further configured to, analyze the data request and determine a display parameter corresponding to the display terminal; and determine a target application scenario from a plurality of application scenarios of the display terminal, and determine a camera matching with the display parameter from the plurality of cameras as a target camera.

13. The cloud server according to claim 11, wherein the correspondence relationship table is updated in real time according to an actual usage situation.

14. The cloud server according to claim 13, wherein the correspondence relationship table is updated according to user's evaluation of quality of images.

15. An image processing method, which is applied to a local end comprising at least one display terminal, comprising:

sending a data request to a cloud server through any one of the at least one display terminal, to enable the cloud server to determine a target application scenario from a plurality of application scenarios of the display terminal according to the data request, and to determine a target camera from a plurality of cameras of a remote end;

receiving processed image data, wherein the processed image data is obtained after the cloud server processes raw image data acquired by the target camera according to a target image processing algorithm corresponding to the target application scenario and the target camera; and displaying the processed image data;

wherein a correspondence relationship table among an image processing algorithm, an application scenario and a camera is stored in the cloud server, and the correspondence relationship table comprises a plurality of image processing algorithms; and the target image processing algorithm corresponding to the target application scenario and the target camera is determined from the plurality of image processing algorithms according to the correspondence relationship table.

16. The image processing method according to claim 15, wherein the displaying the processed image data, comprises:

processing the processed image data from a single-channel digital signal into a multi-channel analog signal; and performing display according to the analog signal.

17. The image processing method according to claim 15, wherein before sending the data request to the cloud server through any one of the at least one display terminal, the method further comprises:

receiving a first input operation of a user for a target application scenario of a plurality of application scenarios of any one of the at least one display terminal; and generating the data request in response to the first input operation.

18. The image processing method according to claim 15, wherein before sending the data request to the cloud server through any one of the at least one display terminal, the method further comprises:

receiving a second input operation of a user for a target application scenario of a plurality of application scenarios of any one of the at least one display terminal and a target camera corresponding to the target application scenario; and generating the data request in response to the second input operation.

* * * * *